United States Patent [19]

Hatano

[11] Patent Number: 4,670,865
[45] Date of Patent: Jun. 2, 1987

[54] METHOD OF RECORDING INFORMATION ON MAGNETO-OPTIC INFORMATION STORAGE MEDIUM

[75] Inventor: Hideki Hatano, Tokorozawa, Japan

[73] Assignee: Pioneer Electronic Corporation, Tokyo, Japan

[21] Appl. No.: 484,996

[22] Filed: Apr. 14, 1983

[30] Foreign Application Priority Data

Apr. 15, 1982 [JP] Japan ................................ 57-062864

[51] Int. Cl.[4] ............................................ G11B 11/00
[52] U.S. Cl. ..................................... 369/13; 360/114; 360/59; 365/122
[58] Field of Search .................................... 369/13–15, 369/54, 58, 106, 116; 360/59, 114, 66; 365/122; 350/375, 376

[56] References Cited

U.S. PATENT DOCUMENTS 4,410,277 10/1983 Yamamoto et al. ............ 360/114 X
4,454,548  6/1984 Jensen .................................. 360/66

FOREIGN PATENT DOCUMENTS 2652790 6/1977 Fed. Rep. of Germany .
56-61054 5/1981 Japan .
56-137538 10/1981 Japan .
2101792 1/1983 United Kingdom ................. 369/13

OTHER PUBLICATIONS

"Readout Performance Analysis of a Cryogenic Magneto-Optical Data Storage System"; Brown, IBM J. Res. Develop, Jan. 1972.
"Experimental Study on Magneto-Optical Disk Exerciser with the Laser Diaode and Amorphous Magnetic Thin Films", by Imamura et al., Japanese Journal of Applied Physics, vol. 19, pp. L731–L734, Dec. 1980.

Primary Examiner—Aristotelis M. Psitos
Attorney, Agent, or Firm—Fleit, Jacobson, Cohn & Price

[57] ABSTRACT

A method of recording information on a magneto-optic information storage medium having a normal magnetization film, comprising modulating a recording beam of light with the pieces of information to be recorded on the information storage medium; irradiating the normal magnetization film with the modulated beam of light in the presence of a bias magnetic field; detecting the sensitivity of recording of the information storage medium throughout the recording area of the information storage medium; and controlling the bias magnetic field to vary with the detected sensitivity of recording.

6 Claims, 2 Drawing Figures

METHOD OF RECORDING INFORMATION ON MAGNETO-OPTIC INFORMATION STORAGE MEDIUM

FIELD OF THE INVENTION

The present invention relates in general to an information recording system and in particular to a magneto-optic information recording system. More particularly, the present invention relates to a method of thermomagnetically recording information in a system using a magneto-optic information storage medium having normal magnetization characteristics.

BACKGROUND OF THE INVENTION

An information recording system has recently been proposed in which pieces of information are in a thermomagnetic fashion written in and read out from a magneto-optic information storage medium consisting of a film of an amorphous ferromagnetic alloy of, for example, gadolinium iron (GdFe) or gadolinium cobalt (GdCo). A thin film of such an alloy is magnetizable in directions normal to the surfaces of the film and is operable as a normal magnetization film. When the normal magnetization film is heated to a temperature higher than the Curie point or the magnetic compensation temperature of the alloy with a weak bias field applied perpendicularly to the film, re-orientation of the spins of electrons takes place and as a consequence the direction of magnetization is inverted at the spots irradiated with the recording laser beam. If the film is preliminarily magnetized in one sense normal to the surfaces of the film and is then irradiated with a recording beam of laser at selected elementary spots of the film, the normal magnetization film is thus heated to such a temperature at the irradiated spots thereof with the result that the direction of magnetization at the particular spots is inverted in the presence of a bias magnetic field applied in the opposite sense to the surfaces of the film. If the original direction of magnetization is assumed to correspond to a logic "0" binary signal, then the inverted direction of magnetization will correspond to a logic "1" binary signal. Logic "0" and "1" binary signals can thus be recorded on a normal magnetization film preliminarily magnetized in a direction representative of either logic "0" or "1" binary signal when the film is irradiated with a laser beam at selected elementary spots thereof in the presence of a bias magnetic field.

The pieces of information which have in this fashion been stored on a magneto-optic information storage medium are read out from the storage medium through detection of the directions of magnetization at the elementary spots of the normal magnetization film by a method utilizing a magneto-optic phenomenon which is known as the magnetic Kerr effect. For this purpose, the normal magnetization film having the pieces of information stored thereon is irradiated with a recording beam of laser passed through a polarizer and the resultant linearly polarized laser beam is focused to the individual elementary spots of the normal magnetization film. The linearly polarized light thus incident on an elementary spot of the normal magnetization film is caused to have its plane of polarization turned through a certain angle in a direction which depends on the direction of magnetization at the particular spot. The laser beam reflected from the normal magnetization film is directed to an optic analyzer which transmits therethrough only the linearly polarized light reflected from an elementary spot magnetized in one direction. The linearly polarized light reflected from an elementary spot magnetized in the other direction is prohibited from being transmitted through the analyzer. The directions of magnetization at the individual elementary spots of the normal magnetization film can be in this manner detected from the beam of light emanating from the analyzer.

The information storage characteristics, particularly, the sensitivity of recording of a magneto-optic information storage medium of the above described nature depend on the chemical composition, magnetic coercivity, Curie temperature and amorphousness of the material forming the normal magnetization film. Difficulties are however encountered in strictly controlling these factors to be uniform throughout the recording area of the normal magnetization film during reproduction of the information stored. Even when the laser power to write information in the normal magnetization film is controlled to be constant throughout the recording operation, the magnitude of the signal output produced from the readout beam reflected from the film varies from one elementary spot of the film to another.

It is, accordingly, a prime object of the present invention to provide an improved magneto-optic information recording system in which the laser power to write information on a magneto-optic information storage medium using a normal magnetization film is controlled to vary with the irregularities in the information storage at the individual elementary spots of the film.

SUMMARY OF THE INVENTION

In accordance with the present invention, there is provided a method of recording information on a magneto-optic information storage medium having a normal magnetization film, comprising modulating a recording beam of light with the pieces of information to be recorded on the information storage medium; irradiating the normal magnetization film with the modulated beam of light in the presence of a bias magnetic field; detecting the sensitivity of recording of the information storage medium throughout the recording area of the information storage medium; and controlling the bias magnetic field to vary with the detected sensitivity of recording.

The information storage medium may be irradiated with the modulated beam of light either while the sensitivity of recording of the information storage medium is being detected or after the sensitivity of recording of the information storage medium has been detected. If the information storage medium is irradiated with the modulated beam of light while the sensitivity of recording of the information storage medium is being detected, the bias magnetic field may be controlled by irradiating the information storage medium with a readout beam of light for reading out the pieces of information recorded on the disc by the recording beam of light while the information storage medium is being irradiated with the modulated recording beam of light; producing binary signals representative of the pieces of information read out by the readout beam of light; detecting the level of the envelope of the binary signals and producing a signal representative of the detected envelope level; and controlling the bias magnetic field on the basis of the above mentioned signal representative of the detected envelope level. If, on the other hand, the information storage medium is irradiated with the modulated beam of light after the sensitivity of recording of the information storage medium has been detected, the bias magnetic field may be controlled by modulating a beam of light with a monitor signal; irradiating the information storage medium with the beam of light modulated with the monitor signal in the presence of a constant bias magnetic field; further irradiating the information storage medium with a readout beam of light for reading out the pieces of information recorded on the disc by the beam of light modulated with the monitor signal while the information storage medium is being irradiated with the beam of light modulated with the monitor signal; producing binary signals representative of the pieces of information read out by the readout beam of light; detecting the level of the envelope of the binary signals and producing a signal representative of the detected envelope level; registering the signal representative of the detected envelope level; and controlling the bias magnetic field on the basis of the registered signal representative of the detected envelope level while the information storage medium is being irradiated with the modulated recording beam of light. In this instance, the above mentioned monitor signal may consist of a frequency-modulated signal representative of the pieces of information to be recorded on the information storage medium or has a substantially fixed level and a frequency identical with the carrier frequency of a frequency-modulated signal representative of the pieces of information to be recorded on the information storage medium.

In accordance with the present invention, the bias magnetic field may otherwise be controlled in such a manner as to vary depending upon the locations at which the recording beam of light is incident on the normal magnetization film.

BRIEF DESCRIPTION OF THE DRAWINGS

The features and advantages of a method according to the present invention will be more clearly appreciated from the following description taken in conjunction with the accompanying drawing in which like reference numerals designate similar or corresponding units, members and elements and in which.

DETAILED DESCRIPTION OF THE INVENTION

Figure 1:
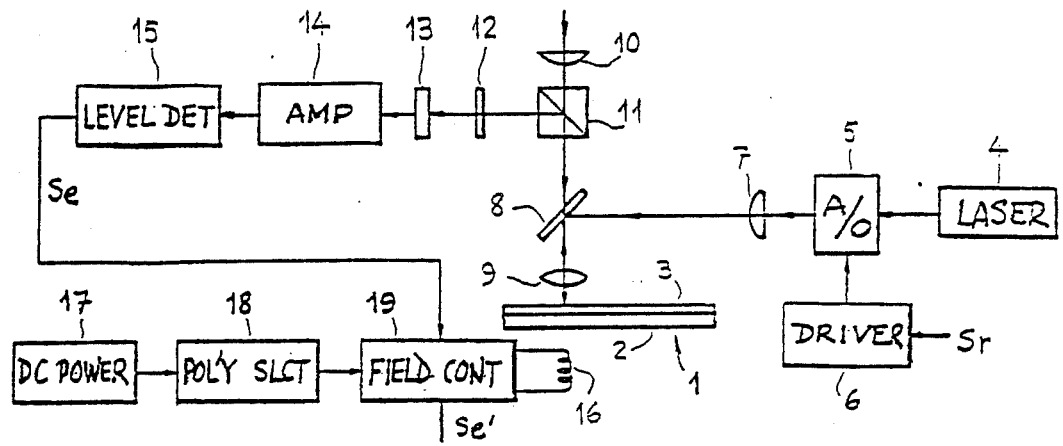
FIG. 1 is a schematic view showing, largely in the form of a block diagram, a magneto-optic information recording system adapted to carry out a method according to the present invention.

In FIG. 1 of the drawing, a magneto-optic information storage disc 1 is shown consisting of a circular substrate 2 of a suitable dielectric substance such as glass or mica and a thin normal magnetization film 3 of an amorphous ferromagnetic alloy of, for example, gadolinium iron (GdFe) or gadolinium cobalt (GdCo) in an amorphous state. For the recording of information on the normal magnetization film 3, the information storage disc 1 is placed on a turntable (not shown) driven for rotation about the center axis thereof and is irradiated with a laser beam originating in a suitable laser radiation unit 4 and having a predetermined wavelength. The laser beam emitted from the laser radiation unit 4 is passed through an acousto-optic (A/O) light modulator 5 and is modulated by the output signal from a driver 6 supplied with a recording signal Sr from a suitable signal source. The recording signal Sr to be supplied to the driver 6 may be a frequency-modulated video and/or audio signal to be recorded on the information storage disc 1. The laser beam is thus modulated in phase and/or amplitude by such a frequency modulated signal Sr and is directed through a lens 7 to a dichroic mirror 8 which is positioned to have a reflective surface angled at 45 degrees with respect to the path of the light from the acousto-optic light modulator 5 and to the information storage disc 1. The laser beam reflected from the dichroic mirror 8 is focused by an objective lens 9 to the surface of the normal magnetization film 3 of the rotating information storage disc 1.

Though not shown in the drawing, there is provided a second laser radiation unit adapted to emit therefrom a readout laser beam differing in wavelength from the laser beam used for the recording of information. The readout laser beam is passed through a lens 10 into a beam splitter prism 11 which has a junction plane inclined at the angles of 45 degrees to the path of the beam transmitted through the lens 10. Thus, the laser beam emanating from the lens 10 enters the beam splitter prism 11 at the angles of 45 degrees to the inclined junction plane of the prism 11 and is focused to the normal magnetization film 3 of the information storage disc 1 through the above mentioned objective lens 9. The readout laser beam incident on the normal magnetization film 3 of the information storage disc 1 thermomagnetically reads the pieces of information recorded on the film 3 and is reflected from the film as a beam containing radio-frequency signals representative of the pieces of information picked up from the normal magnetization film 3. The beam of light carrying the pieces of information read out from the information storage disc 1 in this fashion is passed backwardly through the objective lens 9 and is redirected through the beam splitter prism 11 toward an optic analyzer 12. The beam of light entering the beam splitter prism 11 backwardly is reflected from the inclined junction plane of the prism 11 at the angles of 45 degrees to the path of the light from the information storage disc 1 and is thereby separated from the beam entering the prism 11 from the lens 10. The optic analyzer 12 is adapted to pass therethrough only the linearly polarized light reflected from those elementary spots of the normal magnetization film 3 which are magnetized in a predetermined direction and to reflect the linearly polarized light reflected from the elementary spots magnetized in the opposite direction. The beam of light passed through the analyzer 12 has thus carried thereon the logic "0" or "1" binary signals recorded on the film 3 at the elementary spots magnetized in a predetermined direction. The beam of light emanating from the analyzer 12 is directed to a photoelectric transducer 13 such as a photodiode whereby the detected pieces of information carried by the beam of light incident on the photoelectric transducer 13 are converted into a corresponding radio-frequency electric signal. The radio-frequency signal thus produced by the photoelectric transducer 13 is supplied through a readout amplifier 14 to an envelope level detector 15 adapted to detect the level of the envelope of the radio-frequency signals from the amplifier 14 and to produce an output signal Se representative of the detected envelope level.

Adjacent the normal magnetization film 3 of the information storage disc 1 is provided a field induction coil 16 for inducing a bias magnetic field in the vicinity of the elementary spots of the film 3 to be irradiated with the recording laser beam. When the normal magnetization film 3 is irradiated with the recording laser beam and is thus heated to a temperature higher than the Curie point or the magnetic compensation temperature of the amorphous ferromagnetic alloy in the presence of the bias field thus induced by the coil 16, the direction of magnetization is inverted at the spots irradiated with the beam. The film 3 being preliminarily magnetized in one sense normal to the surfaces of the film and representative of, for example, a logic "0" binary signal, the direction of magnetization at the heated spots of the film 3 is inverted to correspond to a logic "1" binary signal. Logic "0" and "1" binary signals can thus be recorded on the normal magnetization film 3 when the film 3 is irradiated with the recording laser beam at selected elementary spots thereof in the presence of the bias magnetic field induced by the field induction coil 16.

The field induction coil 16 is connected to a d.c. power source 17 through a polarity selector 18 and a field control circuit 19. The field control circuit 19 has a control terminal connected to the output terminal of the above described envelope level detector 15 and is thus operative to control the current to be supplied to the field induction coil 16 and accordingly the magnetic field to be induced by the coil 16 in accordance with the output signal Se from the level detector 15. For this purpose, the field control circuit 19 has incorporated therein a comparator (not shown) adapted to compare the variable input signal Se with a reference signal Se' representative of a predetermined envelope level of the radio-frequency signals to be contained in the beam of light reflected from the normal magnetization film 3 of the information storage disc 1. The field control circuit 19 thus delivers an output current which increases in the presence of an input signal Se lower than the reference signal Se' and decreases in the presence of an input signal Se higher than the reference signal Se'. Accordingly, the magnetic field induced by the field induction coil 16 increases and decreases as the level of the envelope of the radio-frequency signals read out from the normal magnetization film 3 of the storage disc 1 decreases and increases, respectively. The pieces of information carried by the recording laser beam incident on the normal magnetization film 3 is in this manner recorded with uniform sensitivity in the presence of a bias field which is thus controlled by the field control circuit 19.

Figure 2:
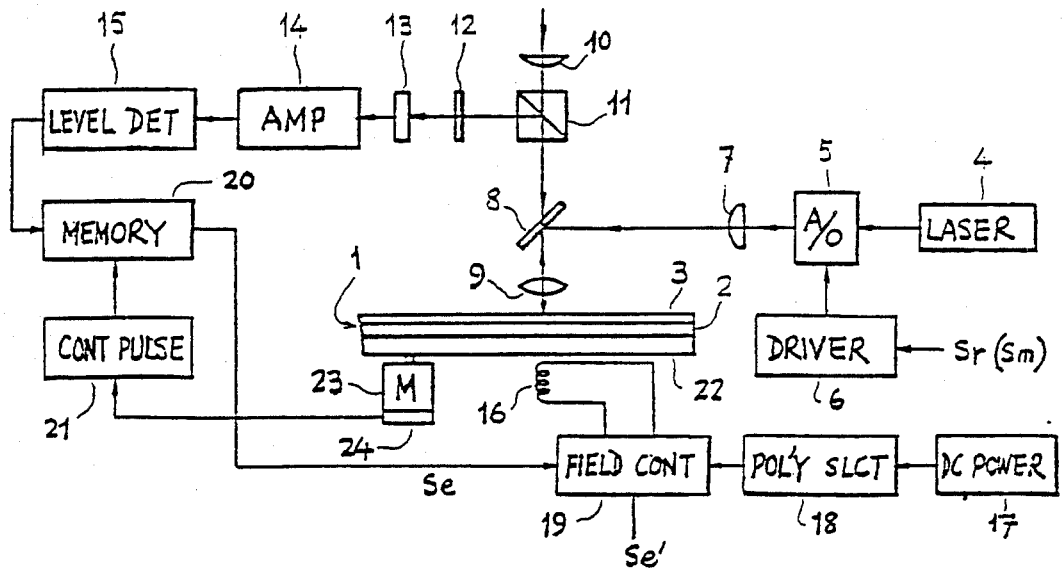
FIG. 2 is a schematic view showing, also largely in the form of a block diagram, a magneto-optic information recording system adapted to carry out another method according to the present invention.

The sensitivity of recording of the information storage disc 1 is controlled concurrently as the information to be recorded on the disc 1 is being recorded thereon in the system hereinbefore described with reference to FIG. 1. If desired, the information to be recorded on an information storage disc may be recorded after variation in the sensitivity of recording of the disc is detected throughout the surface of the disc and registered in suitable memory means. FIG. 2 of the drawing shows a magneto-optic information recording system adapted to carry out such a method.

In the information recording system shown in FIG. 2, a memory circuit 20 is provided between the output terminal of the envelope level detector 15 and the control terminal of the field control circuit 19. The memory circuit 20 is supplied with control pulses from a control pulse generator 21 which is operative to produce the control pulses in synchronism with the rotation of the information storage disc 1. The information storage disc 1 is shown placed on a turntable 22 to be driven for rotation about the center axis thereof by a suitable drive unit such as a spindle motor 23 having an output shaft connected to the spindle of the turntable 22. The rotation of the output shaft of the spindle motor 23 is detected by a synchronizing pulse generator 24 connected to the control pulse generator 21, which is thus operative to produce a series of control pulses in synchronism with the rotation of the turntable 22.

For the detection and registration of the variation in the recording sensitivity of the information storage disc 1, a suitable monitor signal is provisionally recorded on the information storage disc 1 before the pieces of information to be recorded are to be recorded thereon. As such a monitor signal is operable either the frequency-modulated recording signal Sr to be finally recorded on the information storage disc 1 or otherwise a signal Sm with a fixed level and a frequency identical with the carrier frequency of the frequency-modulated record signal Sr. The monitor signal Sr or Sm is supplied to the driver 6 so that the laser beam emitted from the laser radiation unit 4 is modulated in the acousto-optic modulator 5 by the modulating signal produced by the driver 6 supplied with such a signal Sm or Sr. The modulated laser beam is directed through the lens 7, dichroic mirror 8 and objective lens 9 to the surface of the normal magnetization film 3 of the information storage disc 1 so that the monitor signal Sr or Sm carried by the beam incident on the normal magnetization film 3 is thermomagnetically recorded thereon. While the monitor signal Sr or Sm is being thus recorded on the information storage disc 1, the bias magnetic field induced by the field induction coil 16 is maintained constant. The level of the signal Sr or Sm thus recorded provisionally on the information storage disc 1 is detected by the envelope level detector 15 from the electric signal produced by the photoelectric transducer 13 responsive to the beam of light reflected from the normal magnetization film 3 and passed through the optic analyzer 12 while the information storage disc 1 is being driven for rotation on the turntable 22 and irradiated with the beam of light modulated with the monitor signal Sr or Sm. In response to the control pulses delivered from the control pulse generator 21, the memory circuit 20 has registered therein the signal representative of the variation in the envelope level represented by the signal Se produced by the envelope level detector 15. The variation in the recording sensitivity detected is in this fashion registered in the memory circuit 20 in synchronism with the rotation of the information storage disc 1 during provisional recording of the monitor signal Sr or Sm. Upon completion of the detection and registration of the variation in the recording sensitivity of the information storage disc 1, the pieces of information recorded on the normal magnetization film 3 of the information storage disc 1 are erased by tracing the individual elementary spots of the film 3 with a laser beam in the presence of a suitable magnetic field. The frequency-modulated recording signal Sr to be finally recorded is then recorded on the information storage disc 1 by supplying the signal Sr to the driver 6 for the acousto-optic modulator 5. While the recording signal Sr is being thus recorded on the information storage disc 1, the magnetic field induced by the field induction coil 16 is varied in accordance with the signal Se supplied from the memory circuit 20 to the field control circuit 19 in synchronism with the control pulses supplied from the control pulse generator 21.

The coercive force of a magneto-optic information storage disc 1 generally tends to increase radially outwardly of the disc and decrease radially inwardly of the disc as is well known in the art. In accordance with the present invention, the sensitivity of recording of a magneto-optic information storage disc 1 may thus be controlled by continuously varying the bias field as the recording laser beam is displaced radially of the disc during recording of the disc so as to compensate for such a tendency of the coercive force. For this purpose, the bias field may be varied upon detection of the locations of the spots being irradiated with the recording laser beam through use of a potentiometer (not shown) or on the basis of the output pulses produced by a pulse generator responsive to the rotation of the spindle motor 22 similarly to the pulse generator 24 provided in the information recording system shown in FIG. 2.

What is claimed is:

1. A method of recording information on a magneto-optic information storage medium having a normal magnetization film, comprising steps of:
   modulating a recording beam of light with the pieces of information to be recorded on said information storage medium;
   irradiating said normal magnetization film with the modulated beam of light in the presence of a bias magnetic field;
   detecting the sensitivity of recording of each portion of the information storage medium throughout the recording area of the information storage medium by operations of irradiating said information storage medium with a readout beam of light for reading out the pieces of information recorded on the disc by said recording beam of light while the information storage medium is being irradiated with the modulated recording beam of light, producing binary signals representative of the pieces of information read out by said readout beam of light, detecting the level of the envelope of said binary signals and producing a signal representative of the detected envelope level; and
   controlling said bias magetic field on the basis of said signal representative of the detected envelope level.

2. A method of recording information on a magneto-optic information storage medium having a normal magnetization film comprising:
   modulating a recording beam of light with the pieces of information to be recorded on said information storage medium;
   irradiating said normal magnetization film with the modulated beam of light in the presence of a bias magnetic field;
   detecting the sensitivity of recording of the information storage medium throughout the recording area of the information storage medium; and
   controlling said bias magnetic field to vary with the detected sensitivity of recording, in which the information storage medium is irradiated with said modulated beam of light after the sensitivity of recording of the information storage medium has been detected.

3. A method as set forth in claim 2, in which said bias magnetic field is controlled by
   modulating a beam of light with a monitor signal;
   irradiating said information storage medium with the beam of light modulated with the monitor signal in the presence of a constant bias magnetic field;
   further irradiating the information storage medium with a readout beam of light for reading out the pieces of information recorded on the disc by the beam of light modulated with said monitor signal while the information storage medium is being irradiated with the beam of light modulated with the monitor signal;
   producing binary signals representative of the pieces of information read out by said readout beam of light;
   detecting the level of the envelope of said binary signals and producing a signal representative of the detected envelope level;
   registering the signal representative of the detected envelope level; and
   controlling said bias magnetic field on the basis of the registered signal representative of the detected envelope level while the information storage medium is being irradiated with the modulated recording beam of light.

4. A method as set forth in claim 3, in which said monitor signal consists of a frequency-modulated signal representative of said pieces of information to be recorded on the information storage medium.

5. A method as set forth in claim 3, in which said monitor signal has a substantially fixed level and a frequency identical with the carrier frequency of a frequency-modulated signal representative of said pieces of information to be recorded on the information storage medium.

6. A method as set forth in claim 2, in which a location of said information storage medium at which said recording beam of light is incident on said normal magnetization film is detected and said bias magnetic field is controlled to vary depending upon said detected location.

* * * * *